United States Patent [19]

Cole, Jr.

[11] Patent Number: 4,738,654
[45] Date of Patent: Apr. 19, 1988

[54] POWER TRANSMISSION CHAIN PIVOT PIN RETAINERS

[75] Inventor: Edward H. Cole, Jr., Ithaca, N.Y.

[73] Assignee: Borg-Warner Corporation, Chicago, Ill.

[21] Appl. No.: 442,387

[22] Filed: Nov. 17, 1982

[51] Int. Cl.⁴ .......................................... F16H 13/02
[52] U.S. Cl. .................................................. 474/219
[58] Field of Search ............. 474/207, 219, 224, 156, 474/242, 244, 245, 201, 240, 248; 403/155 X, 154; 411/351, 352, 353, 355, 356

[56] References Cited

U.S. PATENT DOCUMENTS

| | | | |
|---|---|---|---|
| 575,718 | 1/1897 | Kammerer | 474/218 |
| 881,493 | 3/1908 | Schmidt, Jr. | 474/223 |
| 1,402,766 | 1/1922 | Hay | 474/219 |
| 1,457,001 | 5/1923 | Pilkington | 411/356 |
| 1,488,710 | 4/1924 | Ramsey | 474/215 |
| 2,344,750 | 3/1944 | Stoltz | 299/82 |
| 3,089,346 | 5/1963 | Dittrich | 474/242 |
| 4,313,730 | 2/1982 | Cole, Jr. et al. | 474/201 |

Primary Examiner—James A. Leppink
Assistant Examiner—Matthew Smith
Attorney, Agent, or Firm—James A. Geppert; Aubrey L. Burgess

[57] ABSTRACT

A retaining clip, which is essentially a C-shaped member, is used to retain the pivot means or joint members of a chain or chain-belt in assembled relationship. The clip spans the chain, and the clip ends engage the pivot means and/or the side links of the chain. The clips can be fabricated from spring steel, spring wire or a plastic.

14 Claims, 6 Drawing Sheets

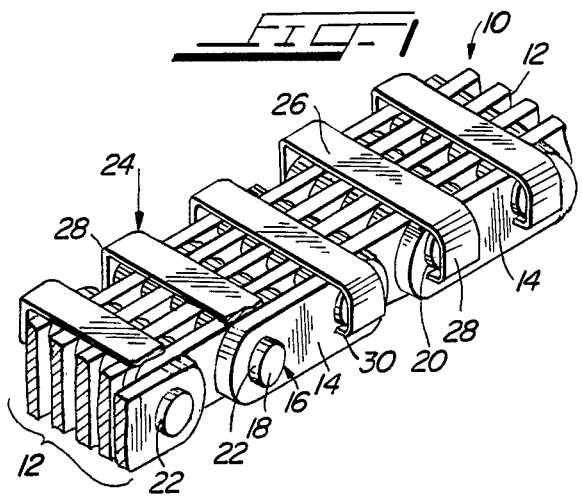
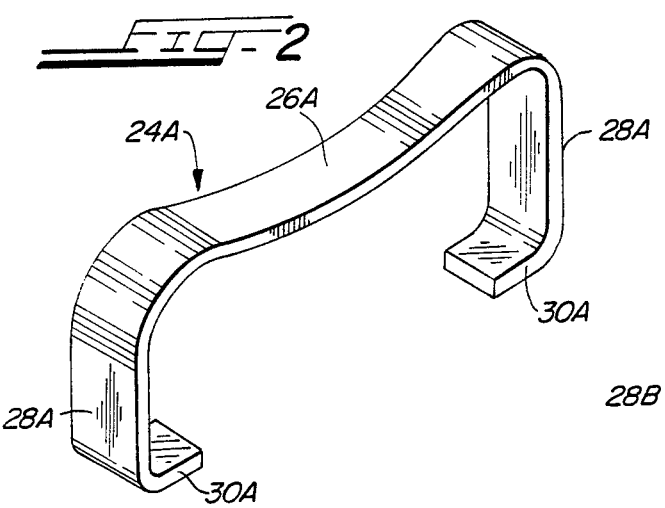
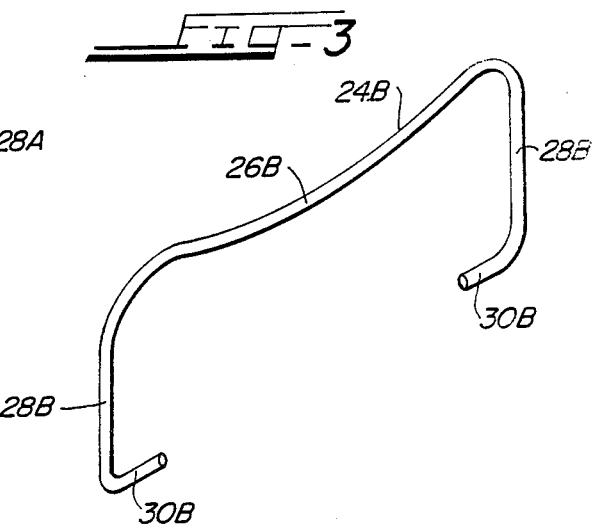
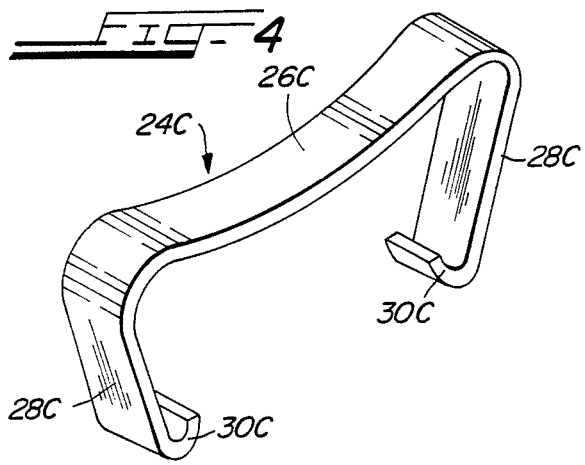
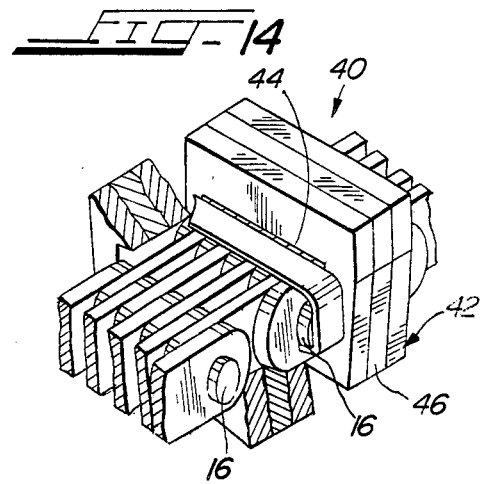

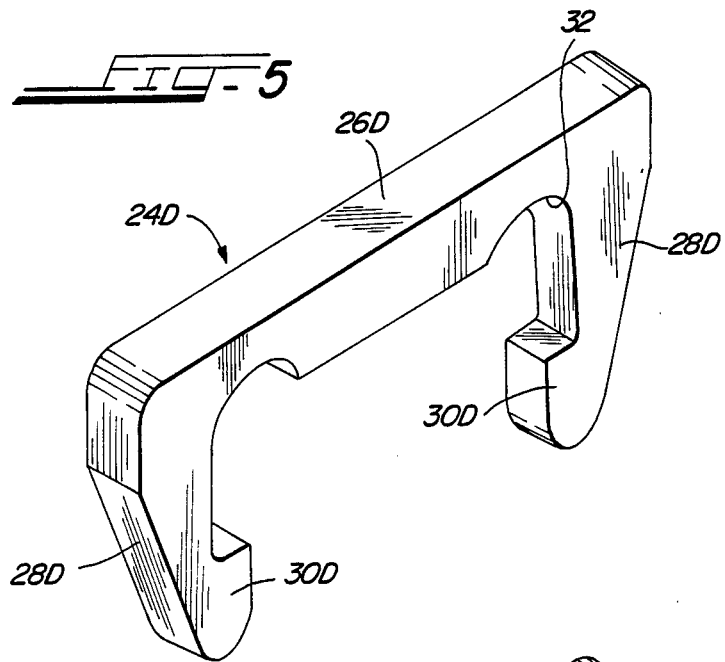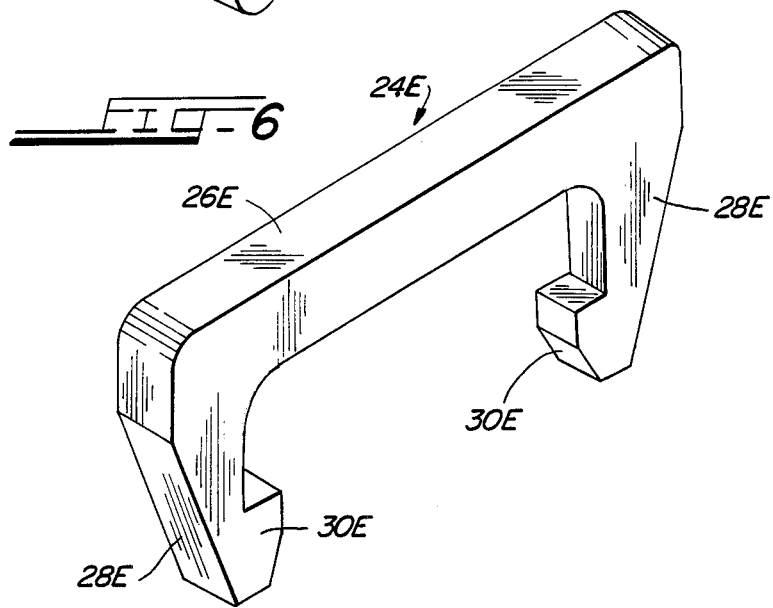

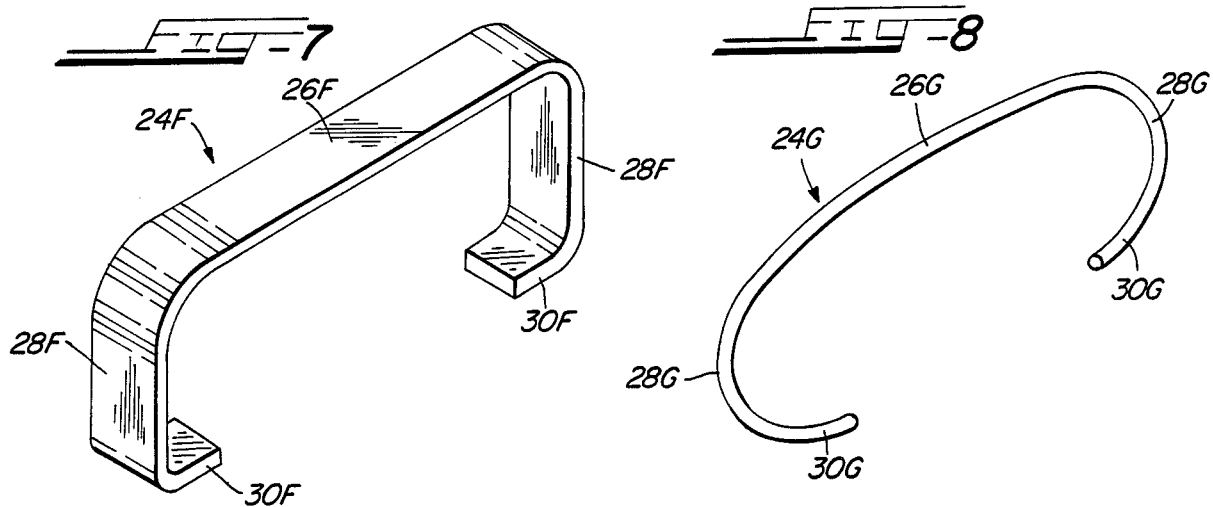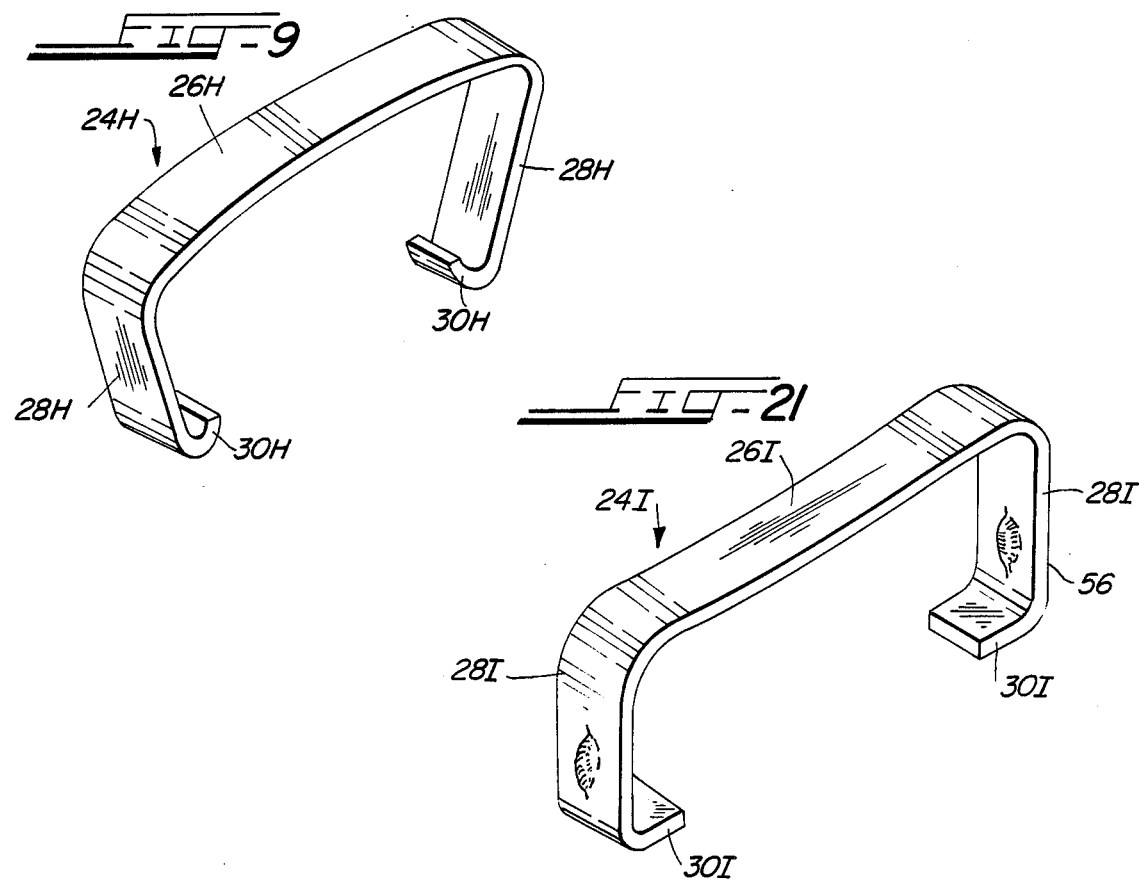

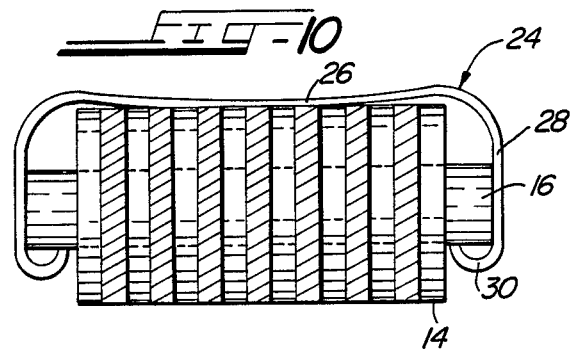
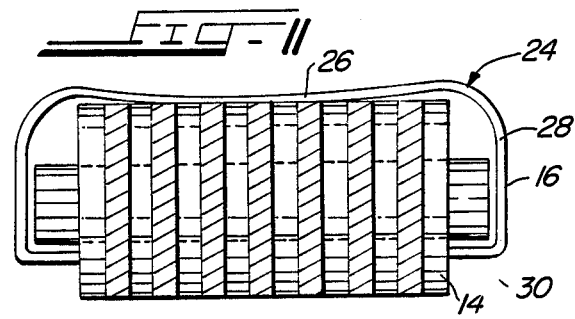
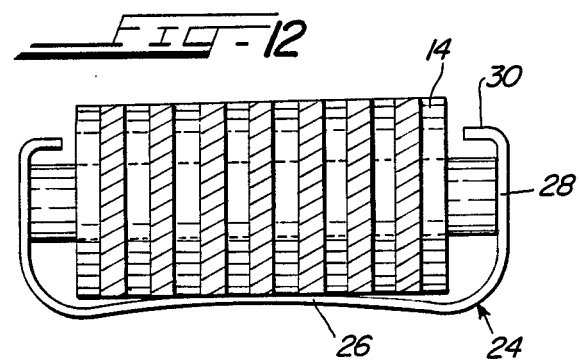
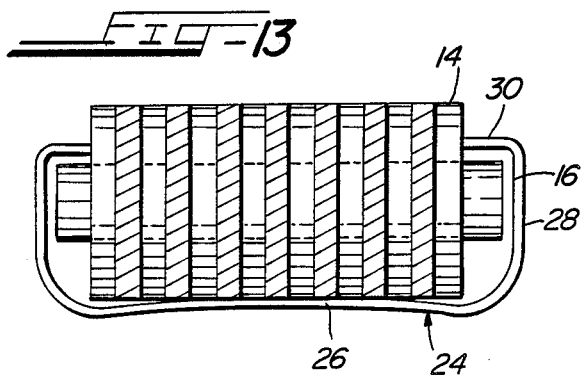

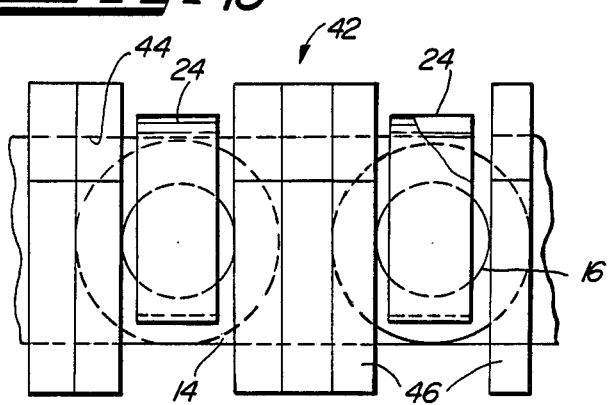
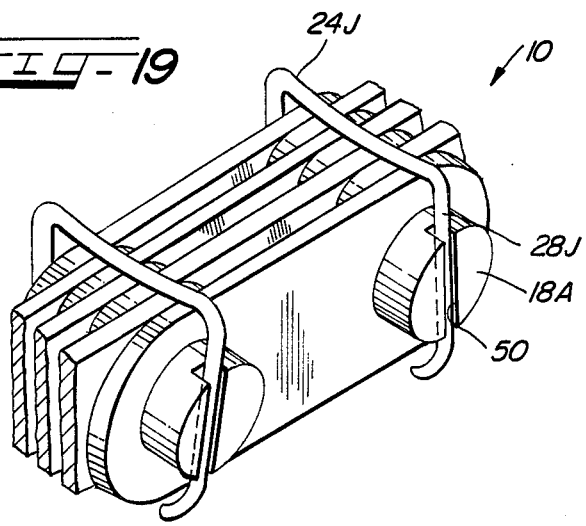
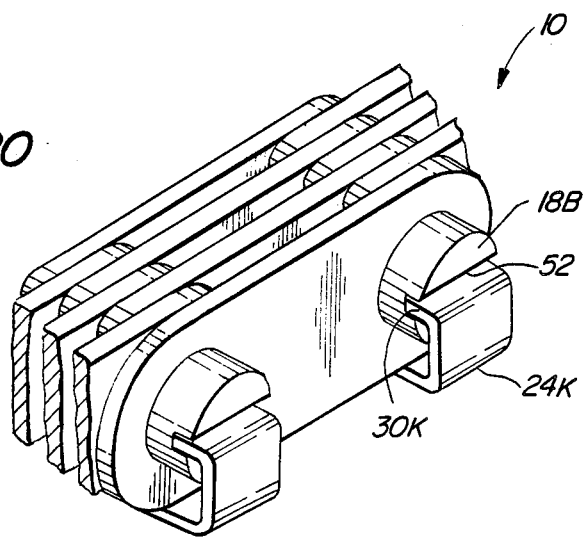

POWER TRANSMISSION CHAIN PIVOT PIN RETAINERS

BACKGROUND OF THE INVENTION

Power transmission chains constructed of a plurality of sets of links with the links of adjacent sets being interleaved with one another are well known in the art. In these chains, each link has a pair of spaced apertures, with the apertures of one set of links transversely aligned for registry with transversely aligned apertures in the interleaved sets of links. Groups of aligned apertures are thus formed, and adjacent sets of links are joined by insertion of a pivot means into each group of aligned link apertures. Such pivot means or joint member or members permit articulation of the chain. The pivot means can be round pins, a pair of pins, each pin of a pair of pins having a surface which rocks on the corresponding surface of the other, or other types of pivot means, as are known in the art. The latter type of pivot means can be designated as a pin and rocker, and the resultant joint as a pin and rocker joint. The pins and rockers can be of the same length, but many times they are of different lengths; they can be of the same cross-sectional shape and size, or of different cross-sectional shapes and sizes. The pivot means, whatever its type, must be retained in the assembly of links to hold the chain together. Well known methods of retaining pivot means in power transmission chains comprise riveting, using cotter pins, and press-fitting the pivot means in a link or links. In using the press-fit arrangement, guide links, flanking the outermost links, are frequently used, with the longer member of a pin and rocker joint being press-fit in a guide link aperture while the shorter member is retained, as a blind member, by the guide links themselves.

A more recent type of chain assembly is known as a chain-belt and is especially suitable for drivingly connecting the pulleys of a pulley transmission. A pulley transmission comprises at least a pair of spaced pulleys, each constructed of a pair of conical flanges. Some pulley transmissions commonly referred to as variable pulley transmissions are constructed so that the axial spacing of the pulley flanges can be varied to change the effective pulley diameters and thus vary the drive ratio therebetween. In a recent patent, U.S. Pat. No. 4,313,730, a chain-belt is described as comprising a chain composed of sets of links interleaved with one another and joined by pivot means, with load blocks located between the adjacent pivot means. The load blocks are shaped to engage the pulley flanges and may be described as generally trapezoidal when viewed from the front. In constructing such a chain-belt, the pivot means need only be physically retained by being press-fit in those links defining one side edge of the chain of the chain-belt because the load blocks surround the chain and retain the links in the desired, transverse grouping.

SUMMARY OF THE INVENTION

According to the present invention, retaining clips constructed either of a metal, such as a spring steel, or a temperature and oil resistant plastic, are used to retain the pivot means or joint members in their apertures, and prevent transverse movement of the pivot means. The pivot means may be round pins, multiple pins, or pins and rockers, and other types of pivot means, as are known in the art. The retaining clips are usable in many types of chains and chain-belts as will be understood from the description herein.

There are several types of retaining clips, each of which is generally similar. Each clip is C-shaped with a curved or straight back of a length to transversely span the links of an assembly of links. Each clip has depending arms, joined to an end of the back, and inwardly directed ends, each of which engages either a link surface or a pivot means. Metal clips can be formed from a narrow ribbon of spring steel or other metal, or from a spring wire. Plastic clips can be injection molded or "cord-wood" cut from a dieformed and extruded, elongated blank, the cross-section of which is as described.

The clips can be located with their backs on the outsides of the chain or with their backs on the inside of the chain, where "inside" and "outside" designate the position of the clips in relationship to a chain composed of a continuous looped assembly of links and pivot means. In a chain-belt, it is preferable to assemble the clips on the outside of the links, because articulation of the assembly is facilitated. However, clips on the inside of a chain are more secure with respect to centrifugal loads. Regardless of the position of the clips, they retain the pivot means or joint members in their apertures in the assembly of links.

Retaining clips can be so shaped to engage the pivot means and prevent rotation or spin of a pivot member, if this is a problem, or they can be seated on the links, so that spin of some types of pivot means can occur. Pivot means can be slotted to receive a part of the clip to fixedly position both the clip and the pivot means. In a chain-belt, because of the proximity of the load blocks and the joint members, longitudinal movement of the clips, parts of which are located over the joint members, is restricted, and no special shaped clips are necessary to engage the pivot means. The various forms of retaining clips will be more fully described as the description proceeds.

The tensile strength of a chain or chain-belt is maximized if each link in the chain carries the same load. It has been found that links into which pivot means are press-fit elongate less per unit load than the other links in the assembly. This generally will lead to an uneven distribution of load among the links of the chain when press-fit links are used as a means of retaining the pivot means. This undesirable result is substantially eliminated by the use of this invention because all links in the chain then elongate equally under equal loads, thereby maximizing chain tensile strength.

The joints of chains and chain-belts are lubricated to reduce frictional effects of the articulation of the chain or chain-belt. Chain-belts, when used in a pulley transmission, are usually run in an oil bath. In addition to the desirable features before enumerated, it has been found that with the use of retaining clips according to the invention, another very important benefit has been realized. The clips function to retain lubricant in the critical pivot means zones.

Further, the use of the retaining clips according to this invention facilitates installation and removal of a chain or chain-belt from its driving means without the use of specialized tools. The chain or chain-belt may be assembled or disassembled at any location along its length by removing the retaining clip, as by a screw driver or other prying tool.

BRIEF DESCRIPTION OF THE DRAWINGS

FIG. 1 is a partial perspective illustration of a chain using retaining clips of this invention;

FIGS. 2, 3, 4, 5, 6, 7, 8 and 9 are perspective views of different forms of retaining clips of this invention;

FIGS. 10, 11, 12 and 13 are cross-sectional views through a chain illustrating various positions and arrangements of retaining clips of this invention;

FIG. 14 is a partial perspective illustration of a chain-belt using retaining clips of this invention;

FIG. 15 is a partial side view of a chain-belt and a retaining clip illustrating the manner of longitudinal retention of the clip by load blocks;

FIGS. 19 and 20 are partial perspective views of modified pivot means using retaining clips of this invention; and FIG. 21 is a perspective view of still another form of retaining clip of this invention.

DETAILED DESCRIPTION OF THE PREFERRED EMBODIMENT

Figure 16A:
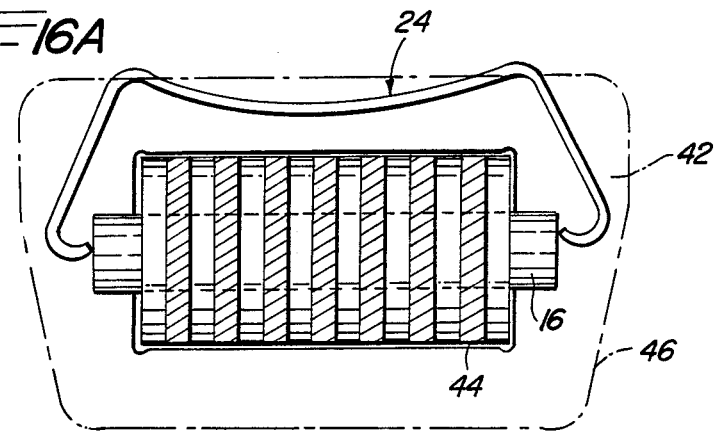
FIGS. 16A and 16B are cross-sectional views illustrating one of the clips being installed in a chain-belt and the installed clip.

FIG. 1 of the drawings illustrates a chain 10 comprising sets 12 of links 14 interleaved with each other and joined by pivot means 16. For purposes of description, the pivot means or joint members 16 are illustrated as round pins 18 and each pin is received in a group of aligned apertures or openings 20 in the interleaved links 14. Each link 14 defines a pair of spaced openings or apertures 22 of like configuration and size, and apertures of one set of links are aligned with apertures of the next adjacent, and interleaved, set to form a group of aligned apertures 20. To retain a pin 18 or any other form of joint member in a group of aligned openings 20 with resorting to the earlier, less advantageous devices, in accordance with this invention a retaining clip 24 is used. Clip 24 is a generally C-shaped member of spring steel or plastic which is positioned to span the chain at the pivot or joint location. The clip has a central, generally straight back portion 26 of a length sufficient to span all the links of two interleaved sets. Clip 24 further includes a pair of depending arms, one extending from each end of, and substantially perpendicular to, the clip back portion, and extending substantially parallel to the outermost link in each set of links. Each depending arm of the clip terminates in an end portion, and each retaining clip end portion engages either (a) the pivot means extending through the interleaved sets of links at the retaining clip location, or (b) a portion of the link surface of the outermost link. The clip end portions, in the embodiment of FIG. 1, extend virtually perpendicular to the depending arm and parallel to the back portion. The retaining clip may be fabricated of flat spring steel stock, or spring wire, or of plastic, as for example, a filled nylon. Plastic clips can be injection molded, or cord-wood cut from an extruded and die-formed blank, or from an elongated machined blank. Materials are chosen for the environment in which the device with which the clip is used. The selected material must be stable at temperatures which reach approximately 200° F. to 300° F.

In the FIG. 1 illustration, clip 24 is illustrated as having a generally flat back part 26, and generally straight ends 30. In this showing each clip end portion 30 bears against, or engages, a surface portion of the outermost link 14. FIGS. 2 to 4 and 21 illustrate clips of spring steel, all generally C-shaped but of slightly different configurations. In these figures each retaining clip has end portions shaped to retain the pivot means against transverse movement relative to the links. The clips and their various parts are identified by using the suffixes A, B, C and so forth. The clips of FIGS. 2, 3, 4 and 21 have inwardly or concavely curved backs 26A, 26B, 26C and 26I; clip 24F of FIG. 7 has a flat back 26F and clips 24G, 24H of FIGS. 8 and 9 have convex backs 26G and 26H. It is apparent that the retaining clip back portions in all of FIGS. 2 to 4, 7 to 9 and 21 are generally straight, even though there is a slight curvature in the clips of FIGS. 2 to 4, 8, 9 and 21.

The clips of FIGS. 2, 3, 7, 8 and 21 have ends 30A, 30B, 30C, 30F, 30G and 30I which could engage the outermost surfaces of the links, while the clips of FIGS. 4 and 9 have ends 30C and 30H which could engage the pivot means, and by doing so, prevent spin of the pivot means. Whether or not the clip ends engage the links or the pivot means is dependent on the dimensions of the clip.

FIGS. 5 and 6 illustrate clips 24D and 24E of plastic which generally are of the same arrangement of component parts, ie, backs 26D and 26E, depending arms 28D and 28E and end portions arms 30D and 30E.

FIGS. 10 and 11 illustrate a clip positioned on the outside of the continuous loop chain 10. Clip 24 in FIG. 10 has its depending arms 28 and end portions 30 engaging the pivot means 16, while the end portions 30 of clip 24 in FIG. 11 engage outside links 14. FIGS. 12 and 13 are somewhat similar to FIGS. 10 and 11, but show a clip 24 positioned on the inside of the chain. In FIG. 12 end portions 30 of clips 24 do not engage the pivot means or the outermost link surface. Both arrangements—clips on the outside or inside of chain 10—can be used and each have advantages, as set out previously.

FIGS. 14 and 15 illustrate a chain-belt 40 particularly adapted to drivingly connect the pulleys (not shown) of a pulley transmission, where the chain-belt is constructed with clips 24 of this invention. The chain is essentially the same as the chain in FIG. 1 and the parts are similarly identified. Chain-belt 4U also comprises groups of load blocks 42 encircling the link sets of the chain, each block group being located between a pair of adjacent pivot means 16. The load blocks 42 are constructed of metal.

A single block may be used between adjacent pivot means, or a group of blocks may be assembled, as illustrated. The multiple block group is less expensive because the blocks can be stamped out of sheet metal and require little, if any, machining. The blocks are generally trapezoidal in shape when viewed from the front, see the broken lines in FIGS. 16A and 16B, for example. Each block or part thereof is formed with a window 44 for encircling the chain, and each has side edges 46, 46 for engagement with the flanges of the pulley of a pulley transmission (not shown). FIG. 15 illustrated clips 24 in relationship to the blocks. The blocks serve to maintain the longitudinal location of the clips; the clips cannot longitudinally move to a position in which they could move off the pivot means.

Figure 16B:
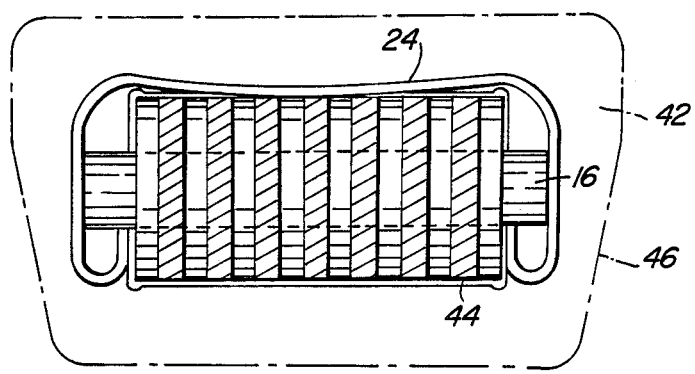
Figure 17:
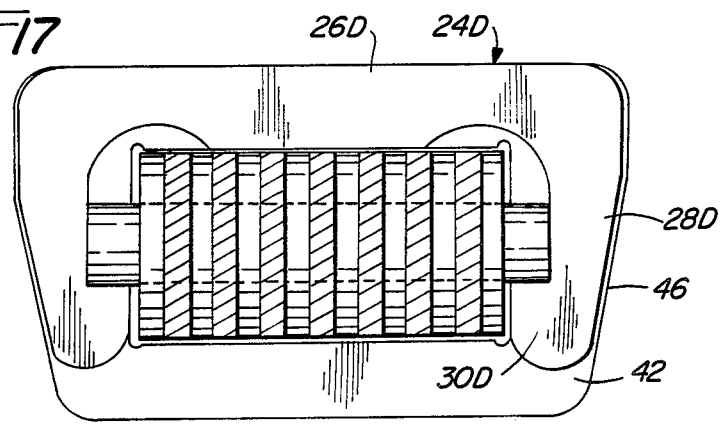
FIGS. 17 and 18 are cross-sectional views through a chain-belt with clips of FIGS. 8 and 9 installed.
Figure 18:
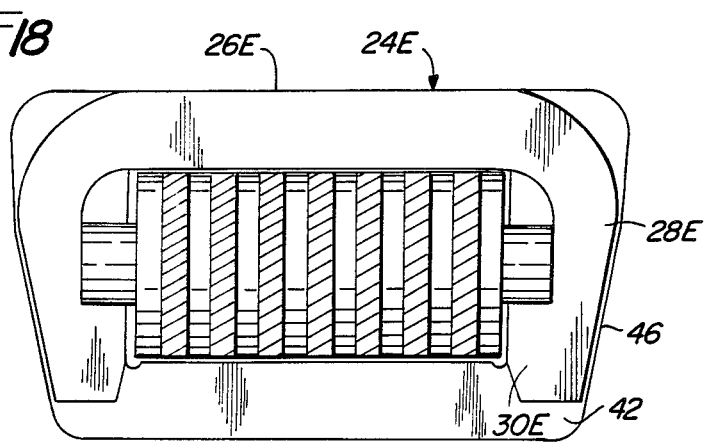

FIG. 16A illustrates a clip 24 being installed over the links of a chain. Because of its construction, the clip can be easily pushed over the chain and joint members, as illustrated. FIG. 16B shows the same clip as installed.

Modifications of pivot means 16 and the relationship with clips 24 are illustrated in FIGS. 19 and 20. In each of the figures, pins 18A and 18B are slotted, as at 50 and 52, to positively receive depending arm 28J of clip 24J (FIG. 19) and end portion 30K of clip 24K (FIG. 20). Depending arms 28I of clip 24I illustrated in FIG. 21 are dimpled, as at 56. This type of clip is useful in FIG. 1 type of chain where the dimpled arms engage the pivot means. Dimpling substantially eliminated longitudinal movement of the arms of the retaining clip off the pivot means.

The plastic clips 24D and 24E have depending arms 28D and 24E angled to be similar in shape to the edges of load blocks 42. In use in a chain-belt application, any tendency for the clips 24D and 24E to laterally spread is restricted as their depending arms engage the pulley flanges of the pulley transmission.

The usual power transmission chain is constructed of steel links joined by heat treated pivot means. This invention, however, can be adapted to chains constructed of other materials, as are known in the art. While pivot means 16 has been illustrated as being round pins 18, it should be under-stood that the invention is usable with other, well known types of pivot means if desired.

I claim:

1. A chain comprising a plurality of sets of interleaved links, pivot means joining adjacent sets of links to form a continuous loop, said pivot means extending substantially to the outermost surfaces of the outermost links of the chain, and a plurality of generally C-shaped resilient and spring-like retaining members, each retaining member having a back portion and attached leg portions, the back portion being free of attachment to and bridging the links of an interleaved set of links and the leg portions being so constructed and arranged to confine the ends of a pivot means while resiliently engaging a part of said chain.

2. A chain as recited in claim 1, in which said retaining members are metal spring clips.

3. A chain as recited in claim 1 in which said retaining members are plastic clips.

4. A chain as recited in claim 2, in which a part of each spring clip engages one of said pivot means.

5. A chain as recited in claim 2, in which a part of each spring clip engages one of said chain links.

6. A chain as recited in claim 3 in which a part of each clip engages one of said pivot means.

7. A chain as recited in claim 3 in which a part of each clip engages one of said chain links.

8. A chain-belt comprising a plurality of sets of interleaved links, pivot means joining adjacent sets of links to form a continuous loop, said pivot means extending substantially to the outermost surfaces of the outermost links of the chain-belt, a plurality of generally C-shaped resilient and spring-like retaining members, each retaining member having a back portion and attached leg portions, the back portion being free of attachment to and bridging the links of an interleaved set of links and the leg portions being so constructed and arranged to confine the ends of a pivot means while resiliently engaging a part of said chain-belt, and means comprising generally trapezoidal load blocks each transversely surrounding a set of links and positioned between adjacent ones of said pivot means for substantially longitudinal positioning each retaining means with respect to its pivot means.

9. A chain-belt as recited in claim 8, in which said retaining members are metal spring clips.

10. A chain-belt as recited in claim 8, in which said retaining members are plastic clips.

11. A chain-belt as recited in claim 9, in which a part of each spring clip engages one of said pivot means.

12. A chain-belt as recited in claim 9, in which a part of each spring clip engages one of said chain links.

13. A chain-belt as recited in claim 10, in which a part of each clip engages one of said pivot means.

14. A chain-belt as recited in claim 10, in which a part of each clip engages one of said chain links.

* * * * *